United States Patent [19]

Miller

[11] 4,203,375
[45] May 20, 1980

[54] ELECTRONIC SWITCHING CONTROL FOR REAR TRANSMISSION

[75] Inventor: Robert G. Miller, East Peoria, Ill.

[73] Assignee: Caterpillar Tractor Co., Peoria, Ill.

[21] Appl. No.: 823,768

[22] Filed: Aug. 11, 1977

[51] Int. Cl.² .................. B60K 20/16; F16H 37/06
[52] U.S. Cl. ............................. 74/335; 74/745;
74/665 L; 180/14 R; 180/77 S
[58] Field of Search .............. 74/335, 665 L, 665 M,
74/665 N, 665 P, 740, 745, 866, 861; 180/14 A,
77 R, 77 S, 77 H, 14 R

[56] References Cited

U.S. PATENT DOCUMENTS

| | | | |
|---|---|---|---|
| 3,093,008 | 6/1963 | Wight | 74/335 |
| 3,326,314 | 6/1967 | Wolf | 180/14 R X |
| 3,512,277 | 5/1970 | Stuller | 180/77 R X |
| 3,561,367 | 2/1971 | Black et al. | 74/665 L X |
| 3,679,018 | 7/1972 | Luft | 180/77 S |
| 3,695,373 | 10/1972 | Bostrom | 74/335 UX |
| 4,004,648 | 1/1977 | Joseph et al. | 180/14 R |

Primary Examiner—Lance Chandler
Attorney, Agent, or Firm—Phillips, Moore, Weissenberger, Lempio & Majestic

[57] ABSTRACT

In a vehicle having separate front and rear transmissions, a system for slaving one of the transmissions to the other so that the slave transmission will operate in the same drive range as that existing in the master transmission. Low-level binary coded signals are separately generated by each transmission to indicate the existing drive ranges of the two transmissions. The signals are sent to a control unit where they are examined and used to shift the slave transmission up or down as necessary, so that it keeps in step with the drive range in which the master transmission is operating. A unique binary code is used in the sending of drive-range signals to the control unit to prevent the control unit from shifting the slave transmission in response to errors in the signals which may occur in the event of faults in the cables through which the signals are sent.

44 Claims, 4 Drawing Figures

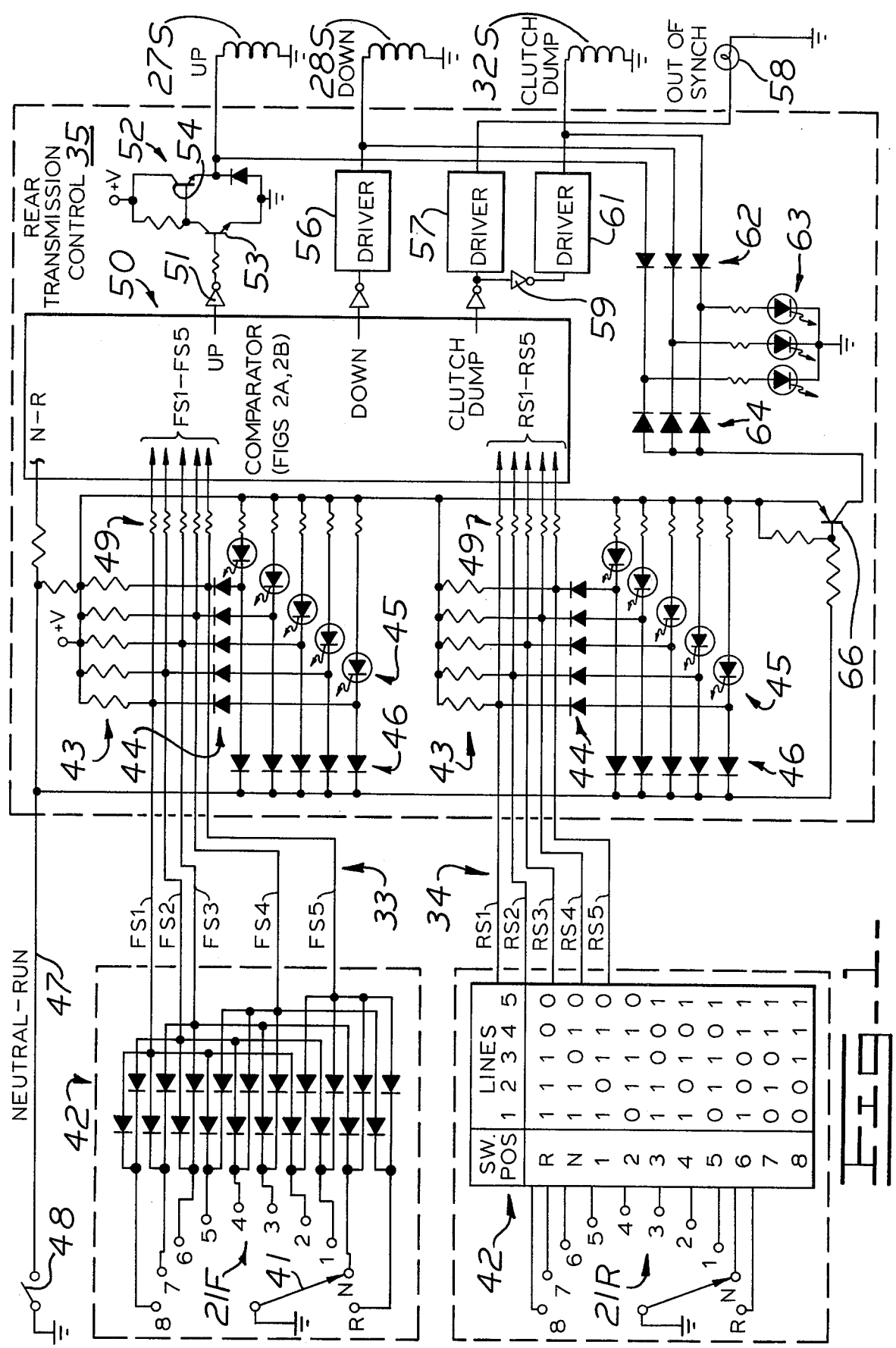

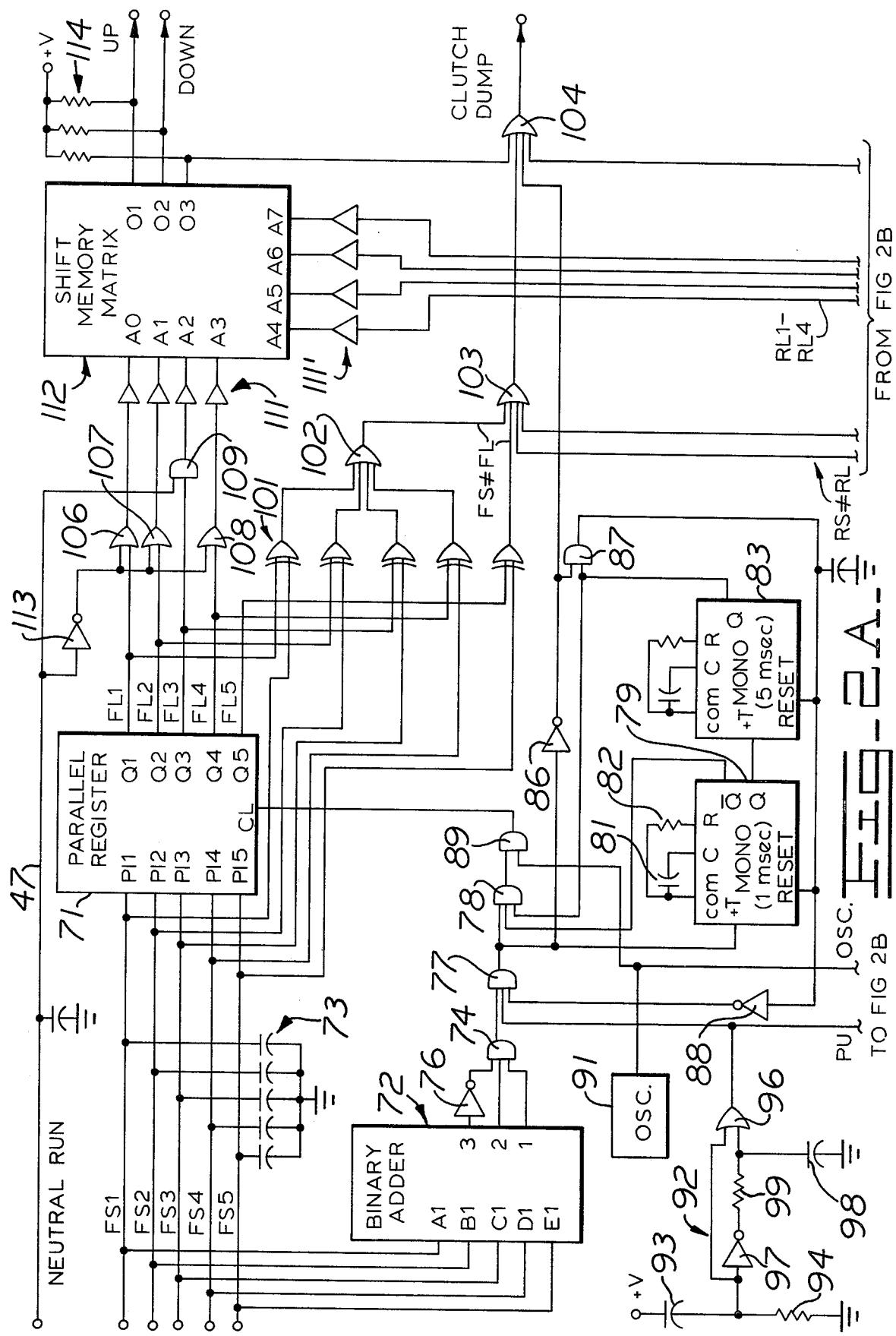

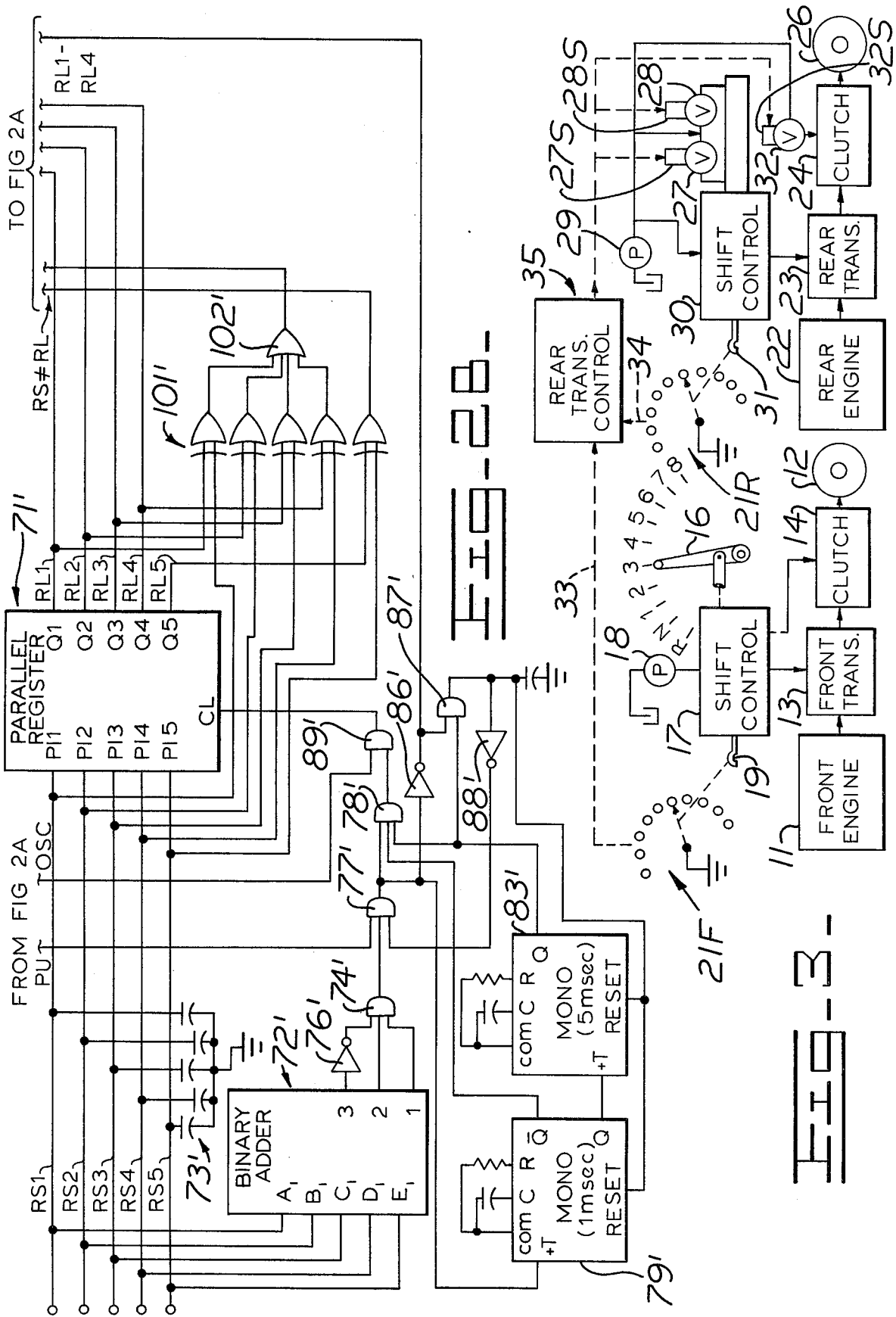

ELECTRONIC SWITCHING CONTROL FOR REAR TRANSMISSION

BACKGROUND OF THE INVENTION

This invention relates to vehicle drive systems and more particularly to systems for coordinating the operation of separate transmission systems in vehicles having more than one engine.

To provide increased traction and load-carrying capacity, certain vehicles, such as large earthmoving equipment, are provided with more than one engine in an arrangement wherein each engine drives a separate set of wheels, tracks or other ground-engaging members through separate transmissions. Under most conditions, it is desirable that the drive ratios of the transmissions be the same at any given time. If the drive ratios are dissimilar, a portion of the total engine output is unused and wear of various vehicle components is accelerated. Typically, the drive ratio is manually or automatically selected at one transmission, which may be termed the master transmission, and remote control means are provided to force a corresponding shift of the other transmission, which may be termed the slave transmission, whenever the master transmission is shifted.

Commonly, the control of the slave transmission is accomplished by use of a rotary switch coupled to the shift control for the master transmission, the switch having a plurality of positions corresponding to each of the drive ranges of the transmission. As the transmission is shifted from one drive range to another, the switch is moved accordingly. The switch positions are connected, by means of a multi-conductor cable, to relays at the shift control for the slave transmission. As the switch changes position, an appropriate relay is energized to cause the rear transmission to shift.

Such systems have a number of disadvantages. Battery power has to be carried through the connecting cable in order to actuate the remotely located relays, and power consumption is accordingly increased. The drive-range-indicating switch also has to handle the relatively high battery current to the relays, thus presenting arcing problems at the switch contacts as a circuit is broken, which leads to premature failure. If the switch resistance is increased, as by dirty contacts, the high current in the circuit will produce an undesirably large voltage drop at the contacts.

Additionally, the connecting cable is usually subject to physical abuse and may develop faults such that a wrong relay is energized in response to the master transmission switch position and the slave transmission is shifted to an improper drive range.

SUMMARY OF THE INVENTION

The main object of the present invention is to provide a transmission control whereby the above-mentioned problems are overcome.

In general, the present invention is usable with the same physical components as in existing master transmissions, including a switch coupled to the shift control to provide an indication of the particular drive range that the master transmission is in. In general, this switch indication is sent to the transmission control for the slave transmission so that the slave transmission is shifted to the same drive range.

The present invention differs from the prior art in the manner in which the master drive-range-indication information is transmitted to the slave transmission control and the manner in which such information is utilized to cause the desired shifting.

First, the information is sent as low-voltage and low-current binary coded signals over the connecting cable to the slave transmission control to provide a low-level signal representing the particular drive range existing in the master transmission. A corresponding binary coded signal is also sent to the control to indicate the drive range existing in the slave transmission. The two signals are examined and a high-level signal is generated to cause an upshift of the slave transmission if it is in a lower drive range than the master transmission. A high-level signal is generated to cause a downshift of the slave transmission if it is in a higher drive range than the master transmission. As a consequence neither the drive-range-indicating switches nor the connecting cables handle high power levels.

In addition, a unique coding arrangement is utilized to send the data over the connecting cables which coding arrangement itself carries sufficient information whereby it can be ascertained from receipt of the data alone whether the data is correct and should be used in the control of the slave transmission. In particular, each drive range has a code utilizing the same number of binary bits and the same number of binary 1's and the same number of binary 0's as any other drive range, with the arrangement of binary 1's and 0's being uniquely different for each drive range. The number of 1's in the code is counted at the slave transmission control and the signal is allowed to be used for control purposes if, and only if, the proper number of binary 1's is present. The coding arrangement safeguards against use of erroneous signals resulting from individual or a plurality of cable faults such as lines being shorted to ground, open or shorted to each other.

Other features and advantages of the present invention will become apparent in the course of the following detailed description.

BRIEF DESCRIPTION OF THE DRAWINGS

In the drawings forming a part of the application, and in which like parts are designated by like reference numerals throughout the same, FIG. 1 is a circuit diagram of a rear transmission control incorporating the present invention;

FIGS. 2A and 2B are circuit diagrams, continuing from one figure to the other, of the comparator of FIG. 1;

FIG. 3 is a simplified illustration of a front and rear transmission of a vehicle and controls therefor.

DESCRIPTION OF THE PREFERRED EMBODIMENT

Referring first to FIG. 3, the present invention is usable with a vehicle, such as an earthmoving machine, having separate engines for the front and rear of the vehicle in order to provide maximum traction and load-carrying capacity. Typically, the vehicle will have a front engine 11 driving the front ground-engaging wheels 12 through the front transmission 13 and clutch 14. The front transmission is controllable by the operator by means of shift lever 16 which may be operated to select any of the available drive ranges, i.e., reverse, neutral or any of the forward gears—the latter being shown here as eight in number. Movement of the shift lever will cause the shift control 17 to deliver pressure fluid from pump 18 to the appropriate clutches in the front transmission 13 so that the transmission is put into the desired drive range. Pressure is relieved from the normally pressured main clutch 14 to release such clutch during shifting. Typically, such a system provides for strictly manual determination of the drive range of transmission 13 in the first forward drive range and in neutral or reverse while providing for automatic or self-shifting action within forward drive ranges two through eight. Adjustment of lever 16 to any drive range between third and eight enables the shift control 17 to automatically shift the transmission 13 between that particular drive range and any other lower drive range down to the second forward drive range in accordance with vehicle speed and location conditions. As is conventional, shift control 17 has a control member 19 which moves to a distinctly different position for each drive range. The control member 19 is coupled to the front gear indicator switch 21F so that movement of member 19 will move switch 21F into a position corresponding to the gear range of the front transmission.

The rear engine 22 similarly transmits power through transmission 23 and clutch 24 to the rear ground-engaging wheels 26. Actuation of one or the other of the UP and DOWN valves 27 and 28 by their solenoid operators 27S and 28S will cause pressure fluid from pump 29 to move the actuator for shift control 30 so that pressure fluid will be delivered to the rear transmission 23 to cause up or down shifting to the desired range. Again, the movable member 31 of shift control 30 will actuate the rear drive-range-indicator switch 21R so that the position of such switch will indicate what drive range the rear transmission is in.

Valve 32 provides a means for actuating clutch 24, to connect or disconnect the rear transmission to or from the rear wheels, valve 32 being operated to open position to supply pressure to clutch 24 when solenoid 32S is energized and being operated to closed position when solenoid 32S is de-energized to dump pressure from the clutch so that it will disengage and disconnect the rear transmission from the rear wheels.

As mentioned previously, efficient use of the power of both engines 11 and 22 to drive the vehicle under most operating conditions requires that the two transmissions 13 and 23 be in the same drive range at a particular time and that a shift of the front transmission be accompanied by a similar shift of the rear transmission. For this purpose, the drive-range-indicating signals generated in response to the particular positions of switches 21F and 21R are transmitted by multiconductor cables 33 and 34 to the rear transmission control unit 35 which takes such information and utilizes it to cause actuation of solenoids 27S, 28S and 32S so that the rear transmission is slaved to the front, or master, transmission.

Successful control of the rear transmission from the front requires that the information sent by cable 33 from the front of the vehicle as to what gear range the front transmission is in be received without error at the rear transmission control unit. If the front transmission were in, say, fifth forward drive range and the rear transmission control unit received a signal which would indicate that the front transmission was in fourth forward drive range, a shift of the rear transmission to fourth would probably not present too much of a problem. However, if the fifth forward drive range signal from the front was instead received as one instructing the rear transmission to shift into reverse, serious damage could result. Similarly, the drive range information sent over cable 34 must be correct for proper functioning of the system.

If the various conductors in the connector cables 33 and 34 remain intact it is not at all difficult to send signals without error to the remotely located rear transmission control 35. Unfortunately it is very difficult to provide sufficient protection to such cables, particularly on large earthmoving vehicles, so that cable faults will not occur. The cables are subject to vibration, chafing, pinching, being struck by sharp and/or heavy objects, and so forth. As a consequence, the occurrence of cable faults is not at all unlikely. In general, three types of faults can occur. One or more of the conductors in a cable can short to ground. One or more of the conductors can break so that the circuit therethrough is opened. Two or more of the conductors can short to one another. Additionally, combinations of these faults can occur at the same time.

In order to prevent erroneous signals from causing improper operation of the rear transmission it is necessary to provide a way for examining these signals, when received, to see if they are erroneous or not and to prevent them from causing the rear transmission control to operate if they are in error.

The present invention accomplishes this by using a multi-conductor cable having N number of data lines connecting a transmission to the rear transmission control unit. The drive-range-indicating signals are sent over such cable by impressing a different arrangement of binary 1's and 0's on such data lines for each of the drive ranges of the transmission. Each different arrangement of binary bits, however, has the same number M of binary 1's and the same number (N-M) of binary bits as any other. The number of binary 1's impressed on the N number of data lines is counted at the rear transmission control and the received signal is not allowed to be operative unless it has exactly M number of binary 1's.

The maximum number of such different binary coded arrangements will depend on the number of data lines used, in accordance with the equation:

$$W_{MAX} = \frac{N!}{M!(N-M)!},$$

wherein N is the number of data lines used, M is the number of binary 1's used, (N-M) is the number of binary 0's used, and $W_{max}$ is the total number of different coded arrangements.

In the present embodiment, indications of ten different drive ranges are generated and sent from each transmission to the rear transmission control unit. A cable with five data lines, and a binary code utilizing three binary 1's and two binary 0's enables ten different coding arrangements to be used.

Turning now to FIG. 1, the front gear range-indicating switch 21F has a grounded switch blade 41 adapted to engage one of the ten indicated terminals in accordance with the gear range existing in the front transmission. The terminals are connected by the diode array 42 to the five front-switch conductors, FS1 through FS5, of cable 33. At the rear transmission control 35, lines FS1–FS5 are each normally held high, at a voltage corresponding to a binary 1, by pull-up resistors 43 which connect the lines to a positive voltage, +V. Similarly, the rear gear range-indicating switch 21R is connected through an identical diode array 42 to the five conductors RS1 through RS5 of cable 34. These lines, too, are each normally held at a binary 1 by pull-up resistors 43.

As will be seen from the front switch diode array 42, a different selected set of two of the FS1–FS5 lines are connected to each of the ten switch terminals. Thus, when switch 21F is in its N, or neutral, position, lines FS3 and FS5 will be grounded, i.e., with a binary 0 impressed thereon, while lines FS1, FS2 and FS4 will have binary 1's impressed thereon at the rear transmission control. The coding arrangements for the ten different switch positions are set forth in the table representing the rear diode array 42.

Switches 21F and 21R are constructed in a break-before-make manner so that when the movable switch member moves from one switch position to the next, it will be momentarily out of contact with any terminal. Thus, during the switching interval of switch 21F, all five lines FS1–FS5 will be ungrounded and at a binary 1 until the switch member moves into contact with the next switch terminal. The same, of course, is true with regard to switch 21R.

Each of the lines FS1–FS5 is connected through diodes 44 and LED's 45 to +V so that if any of the lines is grounded by switch 21F, its corresponding LED will be energized. These lights are used for maintenance purposes to provide a visual indication in which lines are grounded, and thus, by decoding, which position switch 21F is in. Similarly, if any of the rear switch lines RS1–RS5 is grounded, its corresponding LED 45 will be lit. All of the LED's, for both the front and rear switch lines, are separately connected through isolation diodes 46 to the normally high neutral-run line 47, which line is connectable to ground by neutral-run switch 48. When switch 48 is closed, for test purposes, all of the LED's will be energized, so that it can be ascertained if they are in working order. Switch 48 is located in the operator cab and is also used, when desired and as hereinafter described, to enable the operator to put and maintain the rear transmission in neutral while the front transmission is in a reverse or any forward drive range.

The FS1-5 and RS1-5 lines are applied through current-limiting resistors 49 to comparator 50, to be described hereinafter, wherein high signals will be generated to command an upshift or downshift, and/or to dump the pressure from the rear clutch 24. A high signal on the UP output is inverted by inverter 51 and applied to the driver amplifier 52 to turn on transistors 53 which turns on transistor 54 to connect the UP solenoid 27S to +V. When the UP signal subsequently goes low, transistors 53 and 54 will turn off so that the UP solenoid is de-energized. Similarly, a high DOWN signal is inverted and applied to driver amplifier 56 to energize the DOWN solenoid 28S. A high CLUTCH DUMP signal is likewise inverted and applied to drive amplifier 57 to energize the Out-of-Synch light 58 which provides a warning to the operator that the front and rear transmissions are not in the same drive ranges. The inverted CLUTCH DUMP signal is again inverted by inverter 59 and applied to drive amplifier 61 to control the energization of the clutch dump solenoid 32S. This solenoid is normally energized so that the rear clutch 24 is pressured and engaged. A high CLUTCH DUMP signal thus causes the solenoid 32S to be de-energized so that valve 32 will relieve pressure from the clutch so that it will disengage.

The outputs of driver amplifiers 52, 56 and 61 are connected through diodes 62 to the service LED's 63 which will be illuminated when its related one of the solenoids 27S, 28S or 32S is being energized. The LED's 63 are each also connected by diodes 64 to the collector of transistor 66 for test purposes. When the neutral-run switch 48 is closed, the base of transistor 66 is grounded to turn it on and thus supply a high energizing voltage through diodes 64 to all of the LED's 63.

The circuits within comparator 50 are shown in detail in FIGS. 2A and 2B. Referring first to FIG. 2A, the five FS1-FS5 lines from the front drive range switch 21F are connected to the $PI_1$–$PI_5$ inputs of parallel register 71 and also to the $A_1$–$E_1$ inputs of binary adder 72. Capacitors 73 connect each of the FS1–FS5 lines to ground for transient suppression purposes. Parallel register 71 functions herein as a data transmission gate means to allow the binary information at its inputs to be passed therethrough and latched at its $Q_1$–$Q_5$ outputs when the register is clocked by a high signal at its clock input CL. Binary adder 72 functions herein as a means for counting the number of binary 1's which are impressed on lines FS1–FS5. Although parallel register 71 and binary adder 72 are shown herein as single devices, commercially available devices having fewer inputs can be used if ganged together in conventional manners to provide the required capacity.

The basic purpose of binary adder 72 herein is to provide for clocking of parallel register 71 if, and only if, three of the FS1–FS5 lines have a binary 1 impressed thereon. If more or less than three of the lines are at binary 1, parallel register 71 will not be clocked. Binary adder 72 functions in a conventional manner to produce a binary representation at its 1, 2 and 3 outputs corresponding to the number of binary 1's at the $A_1$–$E_1$ inputs. Thus, if no binary 1's are present at the inputs, all of the 1, 2 and 3 outputs will be low. If all of the $A_1$–$E_1$ inputs are at binary 1, the 1 and 3 outputs will be high and the 2 output will be low. If three of the inputs are at binary 1, the 1 and 2 outputs will be high and the 3 output will be low, and so forth.

As mentioned previously, each position of switch 21F will cause the FS1–FS5 lines to be coded so that three of these lines will be at binary 1 and two of the lines will be at binary 0. If, when applied to register 71 and added 72 of comparator 50, three of these lines have a binary 1 impressed thereon, the 1 and 2 outputs of adder 72 will each input a high into the 3-1's AND gate 74. The low 3 output of adder 72 is inverted by inverter 76 to also input a high to gate 74 so that its output will go high. If there is any other count of 1's in adder 72, the output of the 3-1's gate 74 will be low.

The output of gate 74 is fed into AND gate 77. Normally the other two inputs of gate 77 are high, so that when the 3-1's gate 74 outputs a high, gate 77 will output a high. The output of gate 77 is applied both to AND gate 78 and to the +T input of monostable 79. A positive-going triggerpulse applied to the +T input will cause monostable 79 to generate a single pulse, of a length determined by the value of its external capacitor and resistor, 81 and 82. In the disclosed embodiment, the pulse length of monostable 79 is approximately one millisecond.

When monostable 79 is triggered on, its normally high $\overline{Q}$ output will go low and will thus inhibit AND gate 78 from going high during the duration of the pulse of monostable 79. Also when monostable 79 is triggered on, its normally low Q output will go high to apply a positive-edge trigger to monostable 83. In the disclosed embodiment, monostable 83 has a pulse length of approximately five milliseconds. The Q output of monostable 83 is applied to gate 78.

Thus, when the output of gates 74 and 77 go high, in response to a 3-1's count in binary adder 72, gate 78 will continue to output a low until the end of the pulse from monostable 79 and will then output a high for four milliseconds, i.e., until the end of the pulse from monostable 83.

The one millisecond delay between the time that gate 77 goes high and the time that gate 78 goes high provides protection against erratic operation which might result from contact bounce when switch 21F is moved to a new switch position. Further, if there is contact bounce on initial switching so that a 3-1's signal starts the monostables 79 and 83 into operation, and the 3-1's signal is then lost, the low output of gate 77, resulting from the loss of the 3-1's signal, is inverted by inverter 86 and applied to AND gate 87 along with the Q output of monostable 83. This will cause gate 87 to output a high and thereby terminate both the monostable pulses by resetting the monostables. The reset pulse from gate 87 is inverted to a low by inverter 88 and applied to gate 77 to ensure that its output goes low so that monostable 79 will be retriggered after the reset pulse ends by a high from the 3-1's gate 74.

The resetting and retriggering of the monostables thus serves to extend the one-millisecond delay between response of gate 78 to gate 77 so that gate 78 cannot go high until such time as gate 74 has outputted a continuous 3-1's signal for at least a millisecond.

The output of gate 78 is applied to one of the inputs of AND gate 89, along with the output from oscillator 91 so that the output of gate 89 will generate a chain of high clock pulses, at the rate of oscillation of oscillator 91 during the four-millisecond time that gate 78 is outputting a high. These clock pulses are applied to parallel register 71 to clock the binary states of the inputs which exist during the time the clock pulses are being applied through to the outputs, which then latch at such binary states until a next shift occurs.

A power-up circuit 92 is provided to cause the parallel register 71 to clock the switch information on lines FS1-FS5 therethrough when power is first applied to the system. When power is first turned on and a +V voltage is available, the junction between capacitor 93 and resistor 94 will be high and the OR gate 96 will output a high to gate 77. As capacitor 93 charges, the voltage thereacross will increase so that the voltage applied to OR gate 96 and inverter 97 decreases. In due course the voltage applied to OR gate 96 decreases to below its transfer point and its output goes low so that the output of gate 77 will go low, to condition monostable 79 for triggering and to reset the monostables if they had been triggered when power was initially applied. Also, as capacitor 93 charges, the input to inverter 97 will decrease to the transfer point so that it will then output a high. Capacitor 98 now charges through resistor 99 to this high and, in due course, causes OR gate 96 to output a high to gate 77 so that a high output from the 3-1's gate 74 will trigger the monostables and cause clock pulses to be generated to clock the parallel register 71. The power-up OR gate 96 will continue to output a high to gate 77 until such time as power is removed from the system.

The system thus far described operates to detect when a change in drive range of the front transmission occurs, i.e., the 3-1's signal from gate 74 is lost when all of the FS1-FS5 lines are at binary 1 during movement of switch 21F from one position to the next, and the monostable 79 is thereby conditioned to be triggered by the next 3-1's output. The next signal, when the switch 21F closes to its next terminal, will be applied to parallel register 71 and passed therethrough to its latched outputs and the front-switch-latched line FL1 through FL5 if three of the FS1-FS5 lines have binary 1's thereon. The FL1-FL5 lines will remain at the latched code until such time as a new code has been impressed on lines FL1-FL5 and it has been ascertained that the new code has three, and only three, binary 1's in it. Accordingly, the 5-1's code present on lines FS1-FS5 during shifting does not get passed through parallel register 71.

The system provides a safeguard against numerous faults which may occur in the conductor cable 33. If any line in the cable should short to ground, then a binary 0 would appear on that line at the comparator 50 at all times, regardless of the position of switch 21F. Thus, if switch 21F were in a position such that the shorted-to-ground line were to have a binary 1 thereon, it would not. Since with the coding arrangement used herein, two other lines would be grounded by switch 21F, then three lines altogether would be grounded so that only two would have binary 1's thereon. Accordingly, the 3-1's gate 74 would not go high to initiate the generation of a clock pulse. The erroneous signals on the FS1-FS5 lines would be thereby inhibited from passing through the shift register 71. The same would occur if two or more lines were shorted to ground.

It is possible, of course, to have one or two lines shorted to ground and have a 3-1's signal present at the shift register 71 and binary adder 72, so that the signal is clocked through the register. However, this will only occur if the shorted-to-ground lines were supposed to represent a binary 0 in the coding arrangement. Thus, a 3-1's signal may appear at the shift register and be clocked therethrough even with shorted-to-ground lines, but this is allowable since the coding arrangement of the shift register input will be the same as that for the particular switch position.

Similarly, if one of the data lines FS1-FS5 is open, then it cannot be grounded by switch 21F, and it will be at binary 1 regardless of the switch position. If that line were supposed to be grounded by switch 21F, the coding arrangement used herein would have three other of the lines at binary 1. Accordingly the FS1-FS5 lines would have four binary 1's impressed thereon and the 3-1's gate 74 again would not cause a clock pulse to be generated. As a consequence the erroneous signal will not be clocked through the parallel register. The same, of course, is true if two or more lines are open.

If a cable fault occurs which causes two of the lines FS1-FS5 to be shorted together, then if either is grounded by switch 21F, both will be grounded. Thus, if one of the lines is supposed to be at binary 1 and the other at binary 0, both will be at binary 0 and the lines at the binary adder 72 will not have 3-1's thereon.

Each of the FS1-FS5 lines at the input of parallel register 71, and its corresponding FL1-FL5 at the latched outputs thereof are connected to one of the five exclusive-OR gates 101. Such gates will have a high output if the two inputs differ, i.e., one input is high while the other is low. If both inputs are high, or if both are low, these gates will have a low output. Accordingly, if there is any disagreement between the binary states of the input and output lines of the parallel register 71, one or more of the exclusive-OR gates 101 will have a high output. If any of the four exclusive-OR gates fed into OR gate 102 is high, gate 102 will have a high output. If gate 102, and/or the other exclusive-OR gate, has a high output the OR gate 103 will go high, causing OR gate 104 to output a high CLUTCH DUMP signal.

In normal operation, when a signal with 3-1's is applied to the parallel register 71 and clocked therethrough, the signal at the input to the register will remain the same until the switch 21F is changed in response to a shifting of gears. However, if there is a cable fault which occurs during operation such that the binary state of any of the FS1–FS5 lines is changed, the exclusive-OR gates 101 will command an immediate CLUTCH DUMP signal, to cause disengagement of the rear clutch. Additionally, the out-of synch light will be lit to warn the operator of the malfunction.

During normal shifting, the inputs to the parallel register will all go high and thus be in disagreement with the latched output lines so that the CLUTCH DUMP signal will be generated. However, this in itself does not affect clutch operation since the time required for a normal shift is in the order of 0.1 second, and it takes about one second for the rear clutch to disengage after the CLUTCH DUMP signal is generated.

The FL1–FL4 lines from register 71 are applied through OR gates 106, 107 and 108 and AND gate 109, and through buffers 111 to the A0–A3 inputs of the data-signal-responsive, shift memory matrix 112. The other inputs of the OR gates 106, 107 and 108 are connected through inverter 113 to the normally high neutral-run line 47, while the other input of AND gate 109 is connected directly to such line. As a result, when the neutral-run line 47 is high (as it normally is, with switch 48 open) the A0–A3 inputs of the memory matrix 112 will have the same binary state as the Q1–Q4 outputs of the parallel register 71.

The five data lines are necessary for the use of a 3-1's code for ten different drive ranges and so that the binary state of the lines will not be clocked through register 71 unless a 3-1's signal is present. Although all five of the data lines could be inputted into the shift memory matrix 112, so that the full 3-1's code for each drive range would be applied to the memory matrix, it is not necessary to do so. In order to minimize the size of the memory matrix, only the FL1–FL4 lines are used, since only a four bit number, using conventional binary coding, is needed for ten different drive ranges. As will be noted from FIG. 1, the coding in the selected FS1–FS4 lines is uniquely different for each of the ten drive ranges.

At times it is desirable from the operator's standpoint to operate the rear engine with the rear transmission in neutral while the front transmission is in gear. For example, this might be done for maneuvering purposes. In such case, the operator will close the neutral-run switch 48 to ground the neutral-run line 47. Such grounding places a high on OR gates 106, 107 and 108 and a low on AND gate 109 so that the inputs A0–A3 of matrix 112 will have the neutral binary code 1101 impressed thereon regardless of what the code may be at the output of parallel register 71. Thus, closing of the neutral-run switch will cause a coded signal indication of neutral position to override and be substituted for the actual drive-range signal from the front transmission. Such override will last as long as the neutral-run switch 48 is closed. During the time the neutral-run switch is closed, the drive range information from switch 21F will continue to be applied to parallel register 71 and clocked through by a 3-1's signal on changes in the drive range, and the inputs and outputs of shift register 71 will be continually compared. However, the shift memory matrix 112 will continue to see a neutral position code inputted thereinto until such time as the neutral-run switch 48 is opened, at which time the true drive range of the front transmission is again applied to matrix 112.

Turning now to FIG. 2B, the lines RS1–RS5 in cable 34 from the rear gear-range switch 21R are connected to comparator 50 and the binary data thereon are treated in the same manner as described above. Elements in FIG. 2B which correspond to those in FIG. 2A are identified by corresponding and primed reference numerals. Again, the binary states of lines RS1–RS5 are passed through and latched in the outputs of shift register 71' if the count of binary 1's by adder 72' is equal to three. The inputs and outputs of shift register 71' are continuously compared by exclusive-OR gates 101' and the OR gates 103 and 104 will go high if there is any disagreement between the inputs and outputs of register 71'.

Referring again to FIG. 2A, the latched output lines RL1–RL4 (from the Q outputs of shift register 71', FIG. 2B) are applied through buffers 111' to the $A_4$–$A_7$ inputs of the shift memory matrix 112.

The shift memory matrix 112 has a programmed memory for any or all of the 256 different combinations of the binary signals that may be applied to its input terminals $A_0$–$A_7$, such memory being programmed to provide particular high or low voltage signals on its outputs $0_1$, $0_2$ and $0_3$ in accordance with a particular input combination. As described previously, ten different coding arrangements, corresponding to the ten positions of the front switch 21F are applied to the $A_0$–$A_3$ inputs, and ten different coding arrangements are also applied to the $A_4$–$A_7$ inputs. Thus, there are one hundred different combinations of front and rear gear-range positions that can be inputted into matrix 112.

Matrix 112 is programmed such that if the code present at the $A_4$–$A_7$ inputs is indicative of the same drive range as that indicated by the code present at the $A_0$–$A_3$ inputs, the $0_{1-3}$ outputs will all be low.

If, however, the code present at the $A_4$–$A_7$ inputs represents a rear transmission drive range that is lower than the front transmission drive-range code at the $A_0$–$A_3$ inputs, the memory will cause the $0_1$ output to produce a high UP signal to cause up-shifting. Also, the memory will cause the $0_3$ output to produce a high signal which is applied to OR gate 104 to produce a CLUTCH DUMP voltage. The $0_2$ output is held low. Pull-up resistors 114 are provided at the output of matrix 112 to raise the lower level of operation of such matrix to the higher level of operation of the other components in the system.

The memory is also programmed so that if the codes present at the $A_0$–$A_3$ and $A_4$–$A_7$ inputs are indicative of the rear transmission being in a higher drive range than the front transmission, the output $A_2$ will go high to produce a high DOWN signal. Output $0_3$ will also go high so that a CLUTCH DUMP signal is provided. At such time the $0_1$ output will be low.

As a further safeguard against erroneous functioning, the memory of matrix 112 is also programmed so that if a code appears at either the $A_0$–$A_3$ inputs or at the $0_4$–$A_7$ inputs which is not one of the ten true drive-range codes, the $0_3$ output will go high so that pressure to the rear clutch will be dumped.

Thus, if the front and rear transmissions are in the same drive range, the signals to the $A_0$–$A_3$ and $A_4$–$A_7$ inputs will be indicative of such state and the $O_1$–$O_3$ outputs will all be low. If the front transmission shifts up to a higher drive range, the new drive-range code from the front switch 21F will appear at parallel register 71 and will be clocked therethrough by a 3-1's signal to appear at the $A_0$–$A_3$ inputs. The programmed memory corresponding to this new front drive range and the still present rear drive range will command an up shift of the rear transmission. When the rear transmission has shifted up to the same drive range as the front transmission, the new drive-range code of the rear transmission will be clocked through parallel register 71' by a 3-1's signal to appear at the $A_4$–$A_7$ inputs of matrix 112. With the codes now at the $A_4$–$A_7$ inputs and the $A_0$–$A_3$ inputs indicating that the front and rear transmissions are in the same drive range, the UP and CLUTCH DUMP signals terminate to discontinue further shifting. The same general sequence will occur when the front transmission shifts to a lower drive range.

Thus, the present system slaves the rear transmission to the front transmission while providing a high degree of protection against malfunctioning which would occur if erroneous drive-range position signals were to appear at the rear transmission control. The parallel registers 71 and 71' will clock signals through to the shift memory matrix only if such signals have three binary 1's therein. The continuous bit-by-bit comparison of the inputs and outputs of the parallel registers, by the exclusive-OR gates 101 and 101', will dump the rear clutch if there is lack of agreement. If a signal does get through to the matrix 112 which does not match one of the ten position codes, the rear clutch will be dumped.

There is a possibility that during power-up operation an erroneous, and not 3-1's, signal may be clocked through register 71. In such case the inputs and outputs of register 71 will be the same and the exclusive-OR gates will not cause a CLUTCH DUMP signal to be generated. In most instances, the four bits of such erroneous signal presented to the $A_0$–$A_3$ inputs of the memory matrix 112 will be other than one of the ten drive ranges for which the memory is programmed. As a consequence the memory matrix 112 will cause a CLUTCH DUMP signal to be produced. However, it is still possible that the four bits of such erroneous signal might correspond to the signal for one of the ten drive ranges so that the memory matrix would regard the signal as correct. To safeguard against this possibility the output of inverter 86 is applied to the clutch dump OR gate 104. As previously described, inverter 86 will have a high output if the binary adder 72 does not have a 3-1's count, and thus inverter 86 will cause a CLUTCH DUMP signal to be generated if a 3-1's signal is not present. During normal operation after power up, inverter 86 provides a redundant back-up to the exclusive-OR gates 101 to ensure that a CLUTCH DUMP signal is generated in the event of a cable, or other, fault which results in the loss of a 3-1's signal. The output of inverter 86' is similarly used in connection with the signals from the rear transmission.

The present system is further advantageous in that the data lines FS1–FS5 and RS1–RS5 of cables 33 and 34 handle very little power. When a switch position indication is being transmitted to the rear transmission control, only two of the lines are active, these lines being grounded and carrying only the very low current flowing through the pull-up resistors 43. The other three lines in a cable are at a binary 1 voltage level, but these lines simply float at this level and do not carry any current.

In the present embodiment of the invention, the N number of data lines from the front transmission and the N' number of data lines from the rear transmission are each equal to five. Also, the M and M' number of binary 1's used in the coding arrangement for the front and rear transmission drive ranges, respectively, are both equal to three, and the coding arrangement for any given drive range is the same for each of the two transmissions. However, the use of the memory matrix 112 does not restrict use of the invention to such exact correspondence in coding, since such matrix can be programmed as desired to respond to the data which is separately presented at its two sets of inputs $A_0$–$A_3$ and $A_4$–$A_7$.

For transmissions having ten drive ranges there must be ten different coding arrangements presented to the $A_0$–$A_3$ inputs of the memory matrix so that such matrix will know the existing drive range of the front transmission and there must be ten different coding arrangements presented to the $A_4$–$A_7$ inputs to identify the existing drive range of the rear transmission. Which particular code is used for a given drive range is a matter of choice.

For example, the N and N' number of data lines and the M and M' number of binary 1's used for both transmissions could be the same, but the same code could be used to identify different drive ranges in the two transmissions. I.e., a 11001 code could be assigned to represent a third forward drive range for the front transmission (as presently disclosed) and the same code could be arbitrarily assigned to represent the fourth forward drive range of the rear transmission. In such case, if the front transmission and the rear transmission were actually in third and fourth forward range, respectively, the same particular code would be presented to the $A_0$–$A_3$ set of inputs and to the $A_4$–$A_7$ inputs. The memory matrix would be programmed so that if this occurred, a down signal would be generated. Likewise, if such particular code had instead been assigned to represent second forward drive range of the rear transmission the memory matrix would be programmed to produce an up signal when such signal is at the $A_0$–$A_3$ and the $A_4$–$A_7$ sets of inputs.

Likewise, five data lines could be used for both transmission (N and N' would both be five) but the code for the front transmission could be a 3-1's code (M=3) while the code for the rear transmission could be a 2-1's code (M'=2). (In such case the circuit would be designed so that the parallel register 71' would be clocked in response to a count by adder 72' equal to two, and only two). The codes presented to the two sets of inputs of the shift memory matrix 112 would be different from each transmission, but there would still be a unique code for each of the front transmission drive ranges at the $A_0$–$A_3$ inputs and a unique code for each of the rear transmission drive ranges at the $A_4$–$A_7$ inputs. The memory matrix would be programmed accordingly so that for each combination of the sets of signals at its input an up or down signal would be generated if such data indicated that the front transmission was in a higher, or lower, drive range, respectively, than the rear transmission.

It is also possible to assign the coding arrangements for the various drive ranges so that the binary value will progressively increase for each drive range, starting with reverse, then neutral and then upwardly through the various forward drive ranges, and to have the same coding arrangements used for both transmissions. In such event a conventional binary comparator having A and B inputs and A<B and A>B outputs could be used in place of a programmed memory matrix, the A inputs of the comparator being responsive to the data on the data lines from the front transmission and the B inputs being responsive to the data from the rear transmission. If the front transmission is in a lower drive range than the rear, the A<B output of the comparator would produce a down signal. Similarly, an A>B output would generate an up signal. Such A<B and A>B signals would also be utilized to generate a CLUTCH DUMP signal.

The embodiments of the invention in which an exclusive property or privilege is claimed are defined as follows:

1. In a vehicle having a first engine driving a first ground-engaging member through a master transmission and a second engine driving a second ground-engaging member through a slave transmission and clutch and wherein each transmission has a shift control wherein each transmission may be shifted to provide a plurality of drive ranges, a system for coordinating said transmissions comprising:
   first signal-generating means operatively associated with said master transmission for generating signals indicative of the particular drive range existing in said master transmission, said signals being uniquely different for each of the drive ranges of said master transmission,
   second signal-generating means operatively associated with said slave transmission for generating signals indicative of the particular drive range existing in said slave transmission, said signals being uniquely different for each of the drive ranges of said slave transmission,
   signal-responsive means responsive to the signals from said first and second signal-generating means for generating an up signal if the drive range indicated by the signal from said first signal-generating means is higher than the drive range indicated by the signal from said second signal-generating means and for generating a down signal if the drive range indicated by the signal from said first signal-generating means is lower than the drive range indicated by the signal from said second signal-generator,
   an up solenoid operatively associated with the slave transmission shift control for upshifting said slave transmission when said up solenoid is energized,
   a down solenoid operatively associated with the slave transmission shift control for downshifting said slave transmission when said down solenoid is energized,
   means responsive to the presence of said up signal for energizing said up solenoid,
   means responsive to the presence of said down signal for energizing said down solenoid.

2. A system as set forth in claim 1, wherein said first signal-generating means comprises:
   a first switch having a plurality of different positions one for each of the drive ranges of said master transmission, said first switch being operatively associated with said master transmission for movement to a position corresponding to the drive range existing in said master transmission,
   a slave transmission control unit,
   a plurality of master transmission data lines extending from said first switch to said slave transmission control,
   means for grounding selected of said master transmission data lines in accordance with the position of said first switch,
   means for normally impressing a voltage on all of said master transmission data lines which are ungrounded,
   and wherein said second signal-generator comprises:
   a second switch having a plurality of different positions, one for each of the drive ranges of said slave transmission, said second switch being operatively associated with said slave transmission for movement to a position corresponding to the drive range existing in said slave transmission,
   a plurality of slave transmission data lines extending from said second switch to said slave transmission control unit,
   means for grounding selected of said slave transmission data lines in accordance with the position of said second switch,
   means for impressing a voltage on all of said slave transmission data lines which are ungrounded.

3. A system as set forth in claim 2 wherein said means for impressing a voltage on the ungrounded master transmission data lines and said means for impressing a voltage on the ungrounded slave transmission data lines are both disposed at said slave transmission control unit.

4. A system as set forth in claim 1 and further including:
   clutch-actuating means for actuating said clutch to connect and disconnect said slave transmission to and from said second ground-engaging member,
   means operable during the time that either of said up or down signals is present for operating said clutch-actuating means to disconnect said slave transmission from said second ground-engaging member.

5. A system as set forth in claim 1 wherein each of said master and slave transmissions has a neutral position, the system further including:
   neutral-run means including a manually operable switch for generating a signal in response to operation of said switch which signal is indicative of said master transmission being in neutral position, and for applying said signal from said neutral-run means to said signal-responsive means in substitution for the signal from said first signal generating means.

6. A system as set forth in claim 1, the system further comprising:
   a first latch means having inputs connected to said first signal-generator for reception of signals therefrom and outputs connected to said signal-responsive means,
   means responsive to the completion of a shift of said master transmission from one drive range to another for actuating said first latch means to transfer signals from the inputs of said first latch means to the outputs thereof and to latch such signals at said outputs until a subsequent shift of said master transmission is made,
   a second latch means having inputs connected to said second signal-generator for reception of signals therefrom and outputs connected to said signal-responsive means,
   means responsive to the completion of a shift of said slave transmission from one drive range to another for actuating said second latch means to transfer signals from the inputs of said second latch means to the outputs thereof and to latch such signals at said outputs until a subsequent shift of said slave transmission is made.

7. A system as set forth in claim 6 and further including:
   clutch-actuating means for actuating said clutch to connect and disconnect said slave transmission to and from said second ground-engaging member,
   means for continuously comparing the signal at the inputs and outputs of at least one of said latch means and for operating said clutch-actuating means to disconnect said slave transmission from said second ground-engaging member in the event, and during the time, that the signal at the inputs of said latch means differs from the signal at the outputs thereof.

8. A system as set forth in claim 6 and further including:
   clutch-actuating means for actuating said clutch to connect and disconnect said slave transmission to and from said second ground-engaging member,
   means for continuously comparing the signal at the inputs and outputs of each of said first and second latch means and for operating said clutch-actuating means to disconnect said slave transmission from said second ground-engaging member in the event, and during the time, that the signal at the inputs of either of said latch means differs from the signal at the outputs thereof.

9. A system as set forth in claim 7, and further including:
   means operable during the time that either of said up or down signals is present for operating said clutch-actuating means to disconnect said slave transmission from said second ground-engaging member.

10. A system as set forth in claim 2, the system further comprising:
    a first latch means at said slave transmission unit, said first latch means having inputs connected to said master transmission data lines and outputs connected to said signal-responsive means,
    means responsive to the completion of a shift of said master transmision from one drive range to another for actuating said first latch means to transfer signals from the inputs of said first latch means to the outputs thereof and to latch such signals at such outputs until a subsequent shift of said master transmission is made,
    a second latch means at said slave transmission unit, said second latch means having inputs connected to said slave transmission data lines and outputs connected to said signal-responsive means,
    means responsive to the completion of a shift of said slave transmission from one drive range to another for actuating said second latch means to transfer signals from the inputs of said second latch means to the outputs thereof and to latch such signals at such outputs until a subsequent shift of said slave transmission is made.

11. A system as set forth in claim 10 and further including:
    clutch-actuating means for actuating said clutch to connect and disconnect said slave transmission to and from said second ground-engaging member,
    means for continuously comparing the signal at the inputs and outputs of at least one of said latch means and for operating said clutch-actuating means to disconnect said slave transmission from said second ground-engaging member in the event, and during the time, that the signal at the inputs of said latch means differs from the signal at the outputs thereof.

12. A system as set forth in claim 10 and further including:
    clutch-actuating means for actuating said clutch to connect and siconnect said slave transmission to and from said second ground-engaging member,
    means for continuously comparing the signal at the inputs and outputs of each of said first and second latch means and for operating said clutch-actuating means to disconnect said slave transmission from said second ground-engaging member in the event, and during the time, that the signal at the inputs of either of said latch means differs from the signal at the outputs thereof.

13. A system as set forth in claim 1 and further including:
    clutch-actuating means for actuating said clutch to connect and disconnect said slave transmission to and from said second ground-engaging member,
    wherein said signal-responsive means includes means for generating a clutch-operating signal in the event that the signal from either said first or second signal generator means is a signal which is not one of the unique signals for the drive ranges of said transmissions,
    means responsive to the generation of said clutch-operating signal for operating said clutch to disconnect said slave transmission from said second ground-engaging member.

14. In a vehicle having a first engine driving a first ground-engaging member through a master transmission and a second engine driving a second ground-engaging member through a slave transmission and clutch and wherein each transmission has a shift control wherein each transmission may be shifted to provide a plurality of drive ranges, a system for coordinating said transmissions comprising:
    an up solenoid operatively associated with the slave transmission shift control for upshifting said slave transmission when said up solenoid is energized,
    a down solenoid operatively associated with the slave transmission shift control for downshifting said slave transmission when said down solenoid is energized,
    a slave transmission control unit,
    a plurality of master transmission data lines extending from said control unit to said master transmission,
    coding means operatively associated with said master transmission data lines for impressing a binary 1 on selected of said data lines and a binary 0 on the remaining of said data lines in accordance with the particular drive range existing in said master transmission, the selection of said lines being uniquely different for each of the drive ranges of said master transmission,
    a plurality of slave transmission data ines extending from said control unit to said slave transmission,
    coding means operatively associated with said slave transmission data lines for impressing a binary 1 on selected of said data lines and a binary 0 on the remaining of said data lines in accordance with the particular drive range existing in said slave transmission, the selection of said lines being uniquely different from each of the drive ranges of said slave transmission, data-responsive means at said control unit responsive to the binary state of said master transmission data lines and to the binary state of said slave transmission lines for generating an up signal when the binary states of such data lines is indicative that the existing drive range of said master transmission is higher than the existing drive range of said slave transmission and for generating a down signal when the binary states of such data lines is indicative that the existing drive range of said master transmission is lower than the existing drive range of said slave transmission, means responsive to the generation of said up signal for energizing said up solenoid, means responsive to the generation of said down signal for energizing said down solenoid.

15. A system as set forth in claim 14 wherein said master transmission coding means includes means operatively associated with said master transmission for grounding selected of said master transmission data lines in accordance with the particular drive range existing in said master transmission, and wherein said slave transmission coding means includes means operatively associated with said slave transmission for grounding and thereby impressing a binary 0 on selected of said slave transmission data lines in accordance with the particular drive range existing in said slave transmission.

16. A system as set forth in claim 15 wherein said master transmission coding means and said slave transmission coding means both include means at said control unit for impressing a voltage corresponding to a binary 1 on all ungrounded data lines.

17. A system as set forth in claim 14 and further including:

clutch-actuating means for actuating said clutch to connect and disconnect said slave transmission to and from said second ground-engaging member.

means operable during the time that either said up or down signal is present for operating said clutch-actuating means to disconnect said slave transmission from said second ground-engaging member.

18. A system as set forth in claim 14 wherein each of said plurality of drive ranges of said master and slave transmissions includes a neutral position, the system further including:

neutral-run means including a manually operable switch for generating a binary coded signal in response to operation of said switch, said signal having the same code as that produced by the master transmission coding means when said master transmission is in neutral position, and for applying said signal from said neutral-run means to said data-responsive means in substitution for the binary coded signal from said master transmission coding means.

19. A system as set forth in claim 14, the system further comprising:

a first latch means having inputs connected to said master transmission data lines and outputs connected to said data-responsive means, means responsive to the completion of a shift of said master transmission from one drive range to another for actuating said first latch means to transfer the binary state of said master transmission data lines at the inputs of said first latch means to the outputs thereof and to latch such binary state at said outputs until a subsequent shift of said master transmission is made, a second latch means having inputs connected to said slave transmission data lines and outputs connected to said data-responsive means, means responsive to the completion of a shift of said slave transmission from one drive range to another for actuating said second latch means to transfer the binary state of said slave transmission data lines at the inputs of said second latch means to the outputs thereof and to latch such binary state at said outputs until a subsequent shift of said slave transmission is made.

20. A system as set forth in claim 19, and further including:

means for delaying the actuation of said first latch means until a predetermined time following the completion of a shift of said master transmission from one drive range to another, means for delaying the actuation of said second latch means until a predetermined time following the completion of a shift of said slave transmission from one drive range to another.

21. A system as set forth in claim 19 and further including:

clutch-actuating means for actuating said clutch to connect and disconnect said slave transmission to and from said second ground-engaging member, means for continuously comparing the binary state of the inputs and outputs of at least one of said latch means and for operating said clutch-actuating means to disconnect said slave transmission from said second ground-engaging member in the event, and during the time, that the binary state of the inputs of said latch means differs from the binary state of the outputs thereof.

22. A system as set forth in claim 21, and further including:

means operable during the time that either of said up or down signals is present for operating said clutch-actuating means to disconnect said slave transmission from said second ground-engaging member.

23. A system as set forth in claim 19 and further including:

clutch-actuating means for actuating said clutch to connect and disconnect said slave transmission to and from said second ground-engaging member, means for continuously comparing the binary state of the inputs and outputs of each of said first and second latch means and for operating said clutch-actuating means to disconnect said slave transmission from said second ground-engaging member in the event, and during the time, that the binary state of the inputs of either of said latch means differs from the binary state of the outputs thereof.

24. A system as set forth in claim 14 and further including:

clutch-actuating means for actuating said clutch to connect and disconnect said slave transmission to and from said second ground-engaging member, wherein said data-responsive means includes means for generating a clutch-operating signal in the event that the binary state of either said master transmission data lines or said slave transmission data lines is a coded arrangement other than those corresponding to the various drive ranges of said transmission, means responsive to the generation of said clutch-operating signal for operating said clutch-actuating means to disconnect said slave transmission from said second ground-engaging member.

25. In a vehicle having a first engine driving a first ground-engaging member through a master transmission and a second engine driving a second ground-engaging member through a slave transmission and clutch and wherein each transmission has a shift control wherein each transmission may be shifted to provide a plurality of drive ranges, a system for coordinating said transmission comprising:

an up solenoid operatively associated with the slave transmission shift control for shifting said slave transmission when said up solenoid is energized, a down solenoid operatively associated with the slave transmission shift control for downshifting said slave transmission when said down solenoid is energized, a slave transmission control unit, N number of master transmission data lines extending from said control unit to said master transmission, coding means operatively associated with said master transmission data lines for impressing binary 1's on M number of said master transmission data lines and binary 0's on the remaining (N-M) number of said data lines in accordance with the particular drive range existing in said master transmission, the arrangement of the M number of binary 1's and the (N-M) number of binary 0's on said data lines being uniquely different for each of the drive ranges of said master transmission, N' number of slave transmission data lines extending from said control unit to said slave transmission, coding means operatively associated with said slave transmission data lines for impressing binary 1's on M' number of said data lines and binary 0's on the remaining (N'-M') number of said data lines in accordance with the particular drive range existing in said slave transmission, the arrangement of the M' number of binary 1's and the (N'-M') number of binary 0's on said data lines being uniquely different for each of the drive ranges of said slave transmission, data-responsive means at said slave transmission control unit operatively associated with selected of said master transmission lines and selected of said slave transmission lines and responsive to the binary states of said lines when connected thereto for generating an up signal when the binary states of such data lines is indicative that the existing drive range of said master transmission is higher than the existing drive range of said slave transmission and for generating a down signal when the binary states of such data lines is indicative that the existing drive range of said master transmission is lower than the existing drive range of said slave transmission, first means for connecting said selected master transmission data lines to said data-responsive means if, and only if, M number of said N number of master transmission data lines have a binary 1 impressed thereon, second means for connecting said selected slave transmission data lines to said data-responsive means if, and only if, M' number of said N' number of slave transmission data lines have a binary 1 impressed thereon, means responsive to the generation of said up signal for energizing said up solenoid, means responsive to the generation of said down signal for energizing said down solenoid.

26. A system as set forth in claim 25 and further including, clutch-actuating means for actuating said clutch to connect and disconnect said slave transmission to and from said second ground-engaging member, means operable during the time that either of said up or down signals is present for operating said clutch-actuating means to disconnect said slave transmission from said second ground-engaging member.

27. A system as set forth in claim 25 and further including:

first counting means at said slave transmission control unit for counting the number of said master transmission data lines having a binary 1 impressed thereon, means responsive to the count of said first counting means for actuating said first connecting means to connect said data-responsive means to said selected master transmission data lines when said count is exactly equal to the number M, second counting means at said slave transmission control unit for counting the number of said slave transmission data lines having a binary 1 impressed thereon, means responsive to the count of said second counting means for actuating said second connecting means to connect said data-responsive means to said selected slave transmission data lines when said count is exactly equal to the number M'.

28. A system as set forth in claim 27 and further including:

clutch-actuating means for actuating said clutch to connect and disconnect said slave transmission to and from said second ground-engaging member, means responsive to both said first and second counting means for operating said clutch-actuating means to disconnect said slave transmission from said second ground-engaging member in the event the count of binary 1's by either said first or second counting means does not equal the number M or M' respectively.

29. A system as set forth in claim 28 and further including:

means operable during the time that either of said up or down signals is present for operating said clutch-actuating means to disconnect said slave transmission from said second ground-engaging member.

30. A system as set forth in claim 25 wherein said master transmission coding means includes means operatively associated with said master transmission for grounding and thereby impressing a binary 0 on a selected (M-N) number of said master transmission data lines in accordance with the particular drive range existing in said master transmission, and wherein said slave transmission coding means includes means operatively associated with said slave transmission for grounding and thereby impressing a binary 0 on a selected (N-M) number of said slave transmission data lines in accordance with the particular drive range existing in said slave transmission.

31. A system as set forth in claim 25 wherein said master transmission coding means includes a first switch having a plurality of different positions, one for each of the drive ranges of said master transmission, said first switch being operatively associated with said master transmission for movement to a position corresponding to the drive range existing in said master transmission, and means connecting said master transmission data lines to said first switch for grounding a selected (N-M) number of said data lines for each of said switch positions, and wherein said slave transmission coding means includes a second switch having a plurality of different positions, one for each of the drive ranges of said slave transmission, said second switch being operatively associated with said slave transmission for movement to a position corresponding to the drive range existing in said slave transmission, and means connecting said slave transmission data lines to said second switch for grounding a selected (N'-M') number of said data lines for each of said switch positions.

32. A system as set forth in claim 31 wherein said master transmission coding means and said slave transmission coding means both include means at said control unit for impressing a voltage corresponding to a binary 1 on all ungrounded data lines.

33. A system as set forth in claim 25 wherein each of said plurality of drive ranges of said master and slave transmissions includes a neutral position, the system further including:

neutral-run means including a manually operable switch for generating a binary coded signal in response to operation of said switch, said signal having the same code as that produced by the master transmission coding means when said master transmission is in neutral position, and for applying said signal from said neutral-run means to said data-responsive means in substitution for the binary coded signal from said master transmission coding means.

34. A system as set forth in claim 25, wherein said first connecting means comprises a first latch means having inputs and corresponding outputs, said inputs being connected to said master transmission data lines, and selected of said outputs being connected to said data-responsive means, means responsive to the completion of a shift of said master transmission from one drive range to another for actuating said first latch means to transfer the binary state of said master transmission data lines at the inputs of said first latch means to the outputs thereof and to latch such binary state at said outputs until a subsequent shift of said master transmission is made, and wherein said second connecting means comprises a second latch means having inputs and corresponding outputs, said inputs being connected to said slave transmission data lines and selected of said outputs being connected to said data-responsive means, means responsive to the completion of a shift of said slave transmission from one drive range to another for actuating said second latch means to transfer the binary state of said slave transmission data lines at the inputs of said second latch means to the outputs thereof and to latch such binary state at said outputs until a subsequent shift of said slave transmission is made.

35. A system as set forth in claim 25, wherein said first connecting means comprises:

a first latch means having corresponding inputs and outputs, said inputs being connected to said master transmission data lines and selected of said outputs being connected to said data-responsive means, first counting means for counting the number of said master transmission data lines having a binary 1 impressed thereon, means responsive to the count of said first counting means being equal to the number M for actuating said first latch means to connect said outputs to said inputs thereof and to latch the binary state of said inputs at the outputs thereof until a subsequent actuation of said first latch means, and wherein said second connecting means comprises:

a second latch means having corresponding inputs and outputs, said inputs being connected to said slave transmission data lines and selected of said outputs being connected to said data-responsive means, second counting means for counting the number of said slave transmission data lines having a binary 1 impressed thereon, means responsive to the count of said second counting means being equal to the number M' for actuating said second latch means to connect said outputs to said inputs thereof and to latch the binary state of said inputs at the outputs thereof until a subsequent actuation of said second latch means.

36. A system as set forth in claim 35 and further including:

clutch-actuating means for actuating said clutch to connect and disconnect said slave transmission to and from said second ground-engaging member, means for individually continuously comparing the binary state of the inputs and outputs of each of said first and second latch means and for operating said clutch-actuating means to disconnect said slave transmission from said second ground-engaging member in the event, and during the time, that the binary state of the inputs of either of said latch means differs from the binary state of the outputs thereof.

37. A system as set forth in claim 36, and further including:

means operable during the time that either of said up or down signals is present for operating said clutch-actuating means to disconnect said slave transmission from said second ground-engaging member.

38. A system as set forth in claim 35 and further including:

clutch-actuating means for actuating said clutch to connect and disconnect said slave transmission to and from said second ground-engaging member, means responsive to said first and second counting means for operating said clutch-actuating means to disconnect said slave transmission from said second ground-engaging member in the event the count of said first counting means is not equal to the number M or in the event the count of said second counting means is not equal to the number M'.

39. A system as set forth in claim 25 wherein said coding means for said master transmission includes means for impressing a binary 1 on other than M number of said master transmission data lines when said master transmission is in the act of shifting from one drive range to another and wherein said coding means for said slave transmission includes means for impressing a binary 1 on other than M' number of said slave transmission data lines when said slave transmission is in the act of shifting from one drive range to another, wherein said first connecting means comprises:
- a first latch means having corresponding inputs and outputs, said inputs being connected to said master transmission data lines and selected of said outputs being connected to said data-responsive means,
- first counting means for counting the number of inputs of said first latch means which have binary 1's impressed thereon,
- means responsive to said first counting means for actuating said first latch means to transfer the binary state of said inputs of said first latch means to and latch them at the outputs thereof in response to a count of binary 1's by said first counting means which is first not equal to the number M and is then equal to the number M, and wherein said second connecting means comprises:
- a second latch means having corresponding inputs and outputs, said inputs being connected to said slave transmission data lines and selected of said outputs being connected to said data-responsive means,
- second counting means for counting the number of inputs of said second latch means which have binary 1's impressed thereon,
- means responsive to said second counting means for actuating said second latch means to transfer the binary state of said inputs of said second latch means to and latch them at the outputs thereof in response to a count of binary 1's by said second counting means which is first not equal to the number M' and is then equal to the number M'.

40. A system as set forth in claim 39 and further including:
- first timer means responsive to said first counting means and operable when the count of binary 1's by said first counting means is first equal to the number of M following a shift of said master transmission from one drive range to another for delaying actuation of said first latch means until a predetermined time after the beginning of operation of said first timer means,
- second timer means responsive to said second counting means and operable when the count of binary 1's by said second counting means is first dqual to the number M' following a shift of said slave transmission from one drive range to another for delaying actuation of said second latch means for a predetermined time after the beginning of operation of said second timer means.

41. A system as set forth in claim 40 and further including:
- means for resetting said first timer means in the event the count of binary 1's by said first counting means becomes not equal to the number M prior to said predetermined time after the beginning of operation of said first timer means,
- means for resetting said second timer means in the event the count of binary 1's by said second counting means becomes not equal to the number M' prior to said predetermined time after the beginning of operation of said second timer means.

42. A system as set forth in claim 25 and further including:
- clutch-actuating means for actuating said clutch to connect and disconnect said slave transmission to and from said second ground-engaging member,
- wherein said data-responsive means includes means for generating a clutch-operating signal in the event that the binary state of either the selected of said master transmission data lines applied thereto or the selected of said slave transmission data lines applied thereto is a coded arrangement other than those corresponding to the various drive ranges of said transmissions,
- means responsive to the generation of said clutch-operating signal for operating said clutch-actuating means to disconnect said slave transmission from said second ground-engagine member.

43. A system as set forth in claim 25 wherein said data-responsive means comprises a memory matrix programmed to produce said up signal when the binary states of said master transmission data lines and said slave transmission data lines applied to said memory matrix are indicative that the existing drive range of said master transmission is higher than that of said slave transmission, and programmed to produce said down signal when the binary states of said data lines applied thereto are indicative that said the existing drive range of said master transmission is lower than that of said slave transmission.

44. A system as set forth in claim 39 wherein said memory matrix is further programmed to produce a clutch-operating signal in the event that the binary state of either said master transmission data lines or said slave transmission data lines applied to said memory is not indicative of any of the drive ranges of said transmissions,
- clutch-actuating means for actuating said clutch to connect or disconnect said slave transmission to or from said slave transmission to or from said second ground-engaging member,
- means responsive to the production of said clutch operating signal by said memory matrix for operating said clutch-actuating means to disconnect said slave transmission from said second ground-engaging member.

* * * * *